Aug. 21, 1928.

A. P. STEINER 1,681,793

FLEXIBLE COUPLING

Filed March 15, 1927

INVENTOR.
Amos P. Steiner.
BY
ATTORNEY.

Patented Aug. 21, 1928.

1,681,793

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA, A CORPORATION.

FLEXIBLE COUPLING.

Application filed March 15, 1927. Serial No. 175,543.

My said invention relates to flexible couplings the object being to provide a flexible coupling which may be inserted between the ends of the shafts without disturbing the shafts, and having other advantages, all as will be hereinafter more fully described and claimed.

Figure 1:
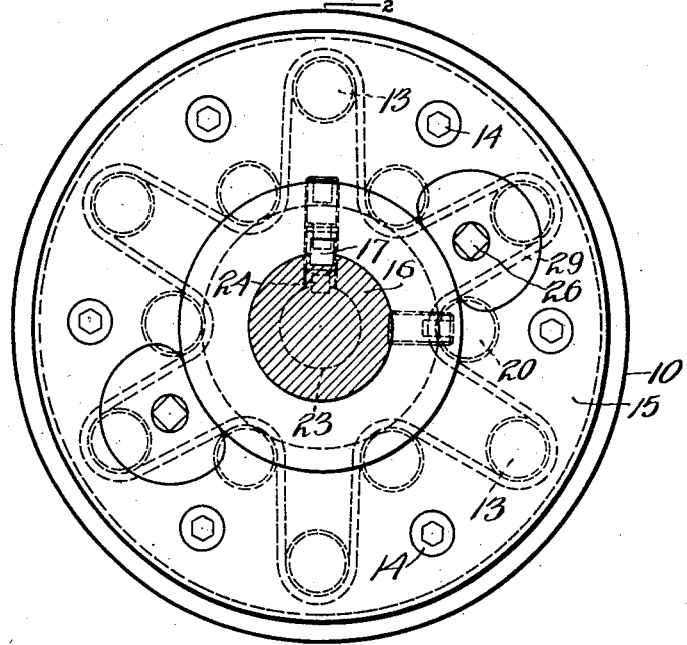
Figure 2:
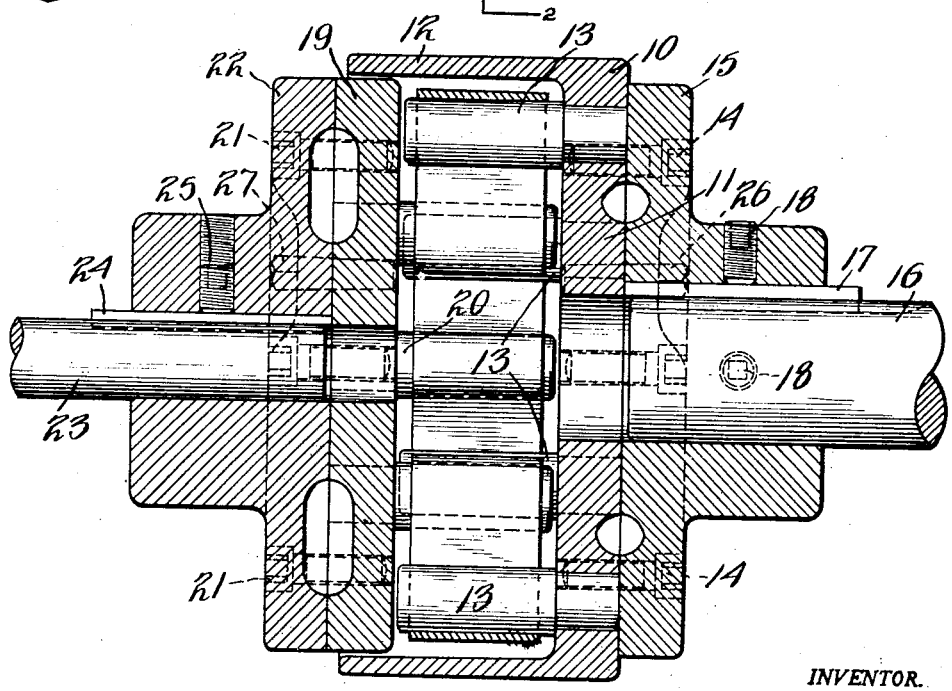

Referring to the accompanying drawings which form a part hereof and on which similar reference characters indicate similar parts, Figure 1 is an end elevation, and Figure 2, is a sectional elevation along the line 2—2 of Figure 1.

In the drawings reference character 10 indicates a cup-shaped casting having the plate member 11 and the flanged ring 12. A plurality of pins 13 are securely fixed to the plate member 11 in any well known manner and arranged preferably equal distances apart and equal distances from the center of the ring. The plate 11 is secured by means of screws or bolts 14 to a flanged member 15. This flange in turn is secured to the shaft 16 by means of key 17 and set screw 18. A ring 19 having pins 20 corresponding in number to the pins 13 on plate 11 is fixed by means of screws 21 to the flange 22. This flange is fixed to the shaft 23 by means of key 24 and set screw 25. Locating pins 26 and 27 may be secured in holes provided in the flange member 15, plate 11 and flange 22 and plate 19 to position the plates with respect to the flanges before fastening the plates to their respective flanges. A belt 29 is passed about the pins 13 and pins 20 as shown in Fig. 1.

It will be apparent that upon rotation of the shaft 16 and the plate 15 the pins 13 engaging the belt 29 will cause this to be tightened against the pins 20 and drive them so as to rotate the shaft 23.

It will be apparent also that there will be a certain lost motion between the shaft 16 and the shaft 20 due to the flexibility and elasticity of the belt 29. This is very desirable in many relations especially in starting and stopping machines having high inertia value.

It will be observed further that the coupling device may be removed from or applied to the flanges of the shafts without disturbing the shafts in their bearings. All that is necessary is to fit the plate 19 within the cup shaped member 12 so that the belt engages alternate pins on the opposite plates and then insert the coupling between the flanges 15 and 22 and fasten them by means of screws 14 and 21. Positioning pins 26 and 27 may be inserted to first position the coupling in order that the set screws may be put in.

With my flexible coupling it is not necessary that the shafts be in exact alinement as a slight displacement will be taken care of by the flexibility of the coupling. It is of course understood that either the outer or the inner set of pins may be the driving member and the other the driven member. It is to be further understood that I do not propose to limit my invention to the exact showing of having the pins on the opposite plates arranged in circles of different diameters for it will be within the scope of my invention to have the pins on the opposite plates arranged in circles of the same size by having the pins of one plate fit between the pins of the other and having the belt passed around the pins.

By using a relatively loose belt 29 considerable lost motion may be provided between the driving and the driven shaft.

It will be obvious to those skilled in the art that various changes may be made in my device without departing from the spirit of the invention and I, therefore, do not limit myself to what is shown in the drawings and described in the specification, but only as set forth in the appended claim.

Having thus fully described my said invention, what I claim as new and desire to secure by Letters Patent, is:

Flexible coupling means for a pair of alined shafts having flanges on the ends, comprising a pair of opposed spaced disks, a series of axially disposed pins carried by one of said disks, a series of pins carried by the other of the disks, a flexible member passing alternately around the pins on one disk and those on the other to provide driving connection between the disks, tapered pins adapted to seat in tapered sockets in the flanges on the shafts and in the disks to center the disks with the shafts, and means for removably securing the disks to said flanges, substantially as set forth.

In witness whereof, I have hereunto set my hand at Waynesboro, Pennsylvania, this 14th day of March, A. D. nineteen hundred and twenty-seven.

AMOS P. STEINER.